US010919509B2

(12) United States Patent
Roh (10) Patent No.: US 10,919,509 B2
(45) Date of Patent: Feb. 16, 2021

(54) ELECTRONIC BRAKE SYSTEM

(71) Applicant: MANDO CORPORATION, Gyeonggi-do (KR)

(72) Inventor: Seunggyu Roh, Gyeongsangnam-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/563,614

(22) Filed: Sep. 6, 2019

(65) Prior Publication Data

US 2020/0079338 A1    Mar. 12, 2020

(30) Foreign Application Priority Data

Sep. 6, 2018    (KR) .................. 10-2018-0106329

(51) Int. Cl.
- *B60T 13/66*    (2006.01)
- *B60T 7/04*    (2006.01)
- *B60T 8/17*    (2006.01)
- *B60T 8/40*    (2006.01)

(52) U.S. Cl.
CPC ............. *B60T 13/66* (2013.01); *B60T 7/042* (2013.01); *B60T 8/17* (2013.01); *B60T 8/4081* (2013.01); *B60Y 2400/81* (2013.01)

(58) Field of Classification Search
CPC . B60T 13/66; B60T 7/042; B60T 8/17; B60T 8/4081; B60T 13/662; B60T 13/686; B60T 13/741; B60T 13/745; B60T 13/142; B60T 13/161; B60T 13/04; B60T 8/34; B60T 8/1755; B60T 8/409; B60T 2270/082; B60Y 2400/81

USPC ..... 303/15, 11, 115.1, 157, 158; 92/13, 169, 92/12, 174
See application file for complete search history.

(56) References Cited

U.S. PATENT DOCUMENTS

| 4,346,944 A * | 8/1982 | Leiber ............... B60T 8/3635 303/115.4 |
| 10,040,438 B2 * | 8/2018 | Lim .................. B60T 13/146 |

(Continued)

FOREIGN PATENT DOCUMENTS

| JP | 2013-252861 | 12/2013 |
| KR | 10-2017-0031402 | 3/2017 |

(Continued)

*Primary Examiner* — Pamela Rodriguez
(74) *Attorney, Agent, or Firm* — Ladas & Parry, LLP (57) ABSTRACT

Disclosed herein is an electronic brake system. The electronic brake system includes a hydraulic pressure supply apparatus generating a hydraulic pressure by moving a piston forward or backward with a rotational force of a motor, and supplying the generated hydraulic pressure to wheel cylinders provided at wheels, respectively; a wheel speed sensor detecting speed of each of the wheels; a piston position detector detecting a position of the piston; and an ECU configured to calculate a piston displacement amount with respect to a vehicle speed change amount during an ABS operation; calculate an actual stroke of the piston; estimate a position of the piston at an entry time point of a preset low speed section; estimate a moving direction remaining stroke; and determine whether to change the moving direction of the piston in advance before entering the preset low speed section.

7 Claims, 8 Drawing Sheets

(56) References Cited

U.S. PATENT DOCUMENTS

| | | | | |
|---|---|---|---|---|
| 2013/0213025 | A1* | 8/2013 | Linden | B60T 8/4031 |
| | | | | 60/327 |
| 2017/0144642 | A1* | 5/2017 | Kim | B60T 13/146 |
| 2017/0158180 | A1* | 6/2017 | Kim | B60T 7/042 |
| 2018/0099652 | A1* | 4/2018 | Jung | B60T 8/4081 |
| 2019/0275996 | A1* | 9/2019 | Cho | B60T 7/042 |

FOREIGN PATENT DOCUMENTS

| | | |
|---|---|---|
| KR | 10-2017-0059039 | 5/2017 |
| KR | 10-2017-00894500 | 8/2017 |
| KR | 10-2018-0039690 | 4/2018 |

* cited by examiner

ELECTRONIC BRAKE SYSTEM

CROSS-REFERENCE TO RELATED APPLICATION(S)

This application is based on and claims priority under 35 U.S.C. § 119 to Korean Patent Application No. 10-2018-0106329, filed on Sep. 6, 2018, in the Korean Intellectual Property Office, the disclosure of which is incorporated herein by reference in its entirety.

BACKGROUND

1. Field

The present disclosure relates to an electronic brake system, and more particularly, to the electronic brake system for generating a braking force in accordance with an electrical signal corresponding to a displacement of brake pedal.

2. Description of the Related Art

In general, a vehicle is essentially equipped with a brake system for braking, and in recent years, various types of brake systems have been proposed to obtain a more powerful and stable braking force.

For example, the brake system includes an anti-lock brake system (ABS) for preventing slippage of the wheels during braking operation, a brake traction control system (BTCS) for preventing the drive wheels from slipping when the vehicle suddenly starts or suddenly accelerates, an electronic stability control system (ESC) for stably maintaining the running state of the vehicle by controlling the brake hydraulic pressure by combining the anti-lock brake system and the traction control system, and the like.

In a conventional brake system, when a driver depresses a brake pedal, a hydraulic pressure necessary for braking is supplied to a wheel cylinder using a mechanically connected vacuum booster. In recent years, instead of the vacuum booster, an electronic brake system has been developed that generates a high pressure brake pressure using a motor and generates a braking force using the motor.

The electronic brake system disclosed in Korean Patent Laid-Open Publication No. 10-2017-0059039 includes a hydraulic pressure supply apparatus for generating a hydraulic pressure by moving a piston using a rotational force of the motor and supplying the generated hydraulic pressure to the wheel cylinder provided at each wheels.

The hydraulic pressure supply apparatus includes a double acting cylinder for reciprocating the piston by reciprocating the piston forward and backward in two pressure chambers partitioned by the piston, and valves for blocking backflow of the pressure and changing the circuit connection when the piston is turned.

The hydraulic pressure supply apparatus generates valve operation noise because the valves are turned on/off when the piston changes a moving direction.

In the ABS operation mode, when the piston is diverted at an ultra-low speed section, for example, an ABS fade-out section immediately before the vehicle is stopped by the ABS operation, the valve operation noise is louder than the surrounding noise. Accordingly, the driver may feel uncomfortable and the braking satisfaction may be reduced.

(Patent Document 1) Korea Patent Laid-Open Publication No. 10-2017-0059039 (published May 30, 2017)

(Patent Document 2) Korea Patent Laid-Open Publication No. 10-2018-0039690 (published Apr. 18, 2018)

SUMMARY

It is an aspect of the present disclosure to provide an electronic brake system capable of reducing operation noise of a hydraulic pressure supply apparatus due to direction change of the piston in a low speed section during anti-lock brake system (ABS) operation.

Additional aspects of the present disclosure will be set forth in part in the description which follows and, in part, will be obvious from the description, or may be learned by practice of the disclosure.

In accordance with one aspect of the present disclosure, an electronic brake system includes a hydraulic pressure supply apparatus configured to generate a hydraulic pressure by moving a piston forward or backward with a rotational force of a motor, and supply the generated hydraulic pressure to wheel cylinders provided at wheels, respectively; a wheel speed sensor configured to detect speed of each of the wheels; a piston position detector configured to detect a position of the piston; and an electronic control unit (ECU) configured to calculate a piston displacement amount with respect to a vehicle speed change amount during an anti-lock brake system (ABS) operation; calculate an actual stroke of the piston by using the calculated piston displacement amount with respect to the vehicle speed change amount; estimate a position of the piston at an entry time point of a preset low speed section based on the calculated actual stroke; estimate a moving direction remaining stroke based on the estimated position of the piston and a moving direction of the piston; and determine whether to change the moving direction of the piston in advance before entering the preset low speed section based on the estimated moving direction remaining stroke.

Further, the ECU may compare the estimated moving direction remaining stroke at the entry time point of the preset low speed section with a preset moving direction minimum remaining stroke; and when the estimated moving direction remaining stroke is greater than the preset moving direction minimum remaining stroke, maintain the moving direction of the piston without changing the moving direction of the piston in advance before entering the preset low speed section.

Further, the ECU may compare the estimated moving direction remaining stroke at the entry time point of the preset low speed section with a preset moving direction minimum remaining stroke; and when the estimated moving direction remaining stroke is smaller than the preset moving direction minimum remaining stroke, change the moving direction of the piston in advance before entering the preset low speed section.

Further, the ECU may estimate a virtual stroke of the piston by performing an inverse operation from a preset target position of the piston at the entry time point of the low speed section based on the calculated piston displacement amount with respect to the vehicle speed change amount and the preset target position of the piston; and compare the calculated actual stroke with the estimated virtual stroke, and changes the moving direction of the piston in advance at a time point at which the calculated actual stroke and the estimated virtual stroke intersect such that the calculated actual stroke follows the estimated virtual stroke before entering the preset low speed section.

Further, the preset low speed section may be an anti-lock brake system (ABS) fade-out section.

In accordance with another aspect of the present disclosure, an electronic brake system includes a hydraulic pressure supply apparatus configured to generate a hydraulic pressure by moving a piston forward or backward with a rotational force of a motor, and supply the generated hydraulic pressure to wheel cylinders provided at wheels, respectively; a wheel speed sensor configured to detect speed of each of the wheels; a piston position detector configured to detect a position of the piston; and an electronic control unit (ECU) configured to calculate a piston displacement amount with respect to a vehicle speed change amount during an anti-lock brake system (ABS) operation; calculate an actual stroke of the piston by using the calculated piston displacement amount with respect to the vehicle speed change amount; estimate a virtual stroke of the piston by performing an inverse operation from a preset target position of the piston at the entry time point of the low speed section based on the calculated piston displacement amount with respect to the vehicle speed change amount and the preset target position of the piston; compare the calculated actual stroke with the estimated virtual stroke, and when the calculated actual stroke behaves differently from the estimated virtual stroke, changes the moving direction of the piston in advance at a time point at which the calculated actual stroke and the estimated virtual stroke intersect such that the calculated actual stroke follows the estimated virtual stroke before entering the preset low speed section.

In accordance with the other aspect of the present disclosure, an electronic brake system includes a hydraulic pressure supply apparatus configured to generate a hydraulic pressure by moving a piston forward or backward with a rotational force of a motor, and supply the generated hydraulic pressure to wheel cylinders provided at wheels, respectively; a wheel speed sensor configured to detect speed of each of the wheels; a piston position detector configured to detect a position of the piston; and an electronic control unit (ECU) configured to calculate a piston displacement amount with respect to a vehicle speed change amount during an anti-lock brake system (ABS) operation; calculate an actual stroke of the piston by using the calculated piston displacement amount with respect to the vehicle speed change amount; estimate a virtual stroke of the piston by performing an inverse operation from a preset target position of the piston at the entry time point of the low speed section based on the calculated piston displacement amount with respect to the vehicle speed change amount and the preset target position of the piston; determine whether a preset forward direction remaining stroke is secured at an entry time point of an ABS fade-out section based on the calculated actual stroke, and when the preset forward direction remaining stroke is not secured, change the moving direction of the piston in advance at a time point at which the calculated actual stroke and the estimated virtual stroke intersect such that the calculated actual stroke follows the estimated virtual stroke, and when the preset forward direction remaining stroke is secured, maintains the moving direction of the piston without changing the moving direction of the piston in advance.

BRIEF DESCRIPTION OF THE DRAWINGS

The present disclosure will be described in detail with reference to the following drawings, which illustrate preferred embodiments of the present disclosure, and thus the technical idea of the present disclosure should not be construed as being limited thereto.

DETAILED DESCRIPTION

Hereinafter, the embodiments of the present disclosure will be described in detail with reference to accompanying drawings. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
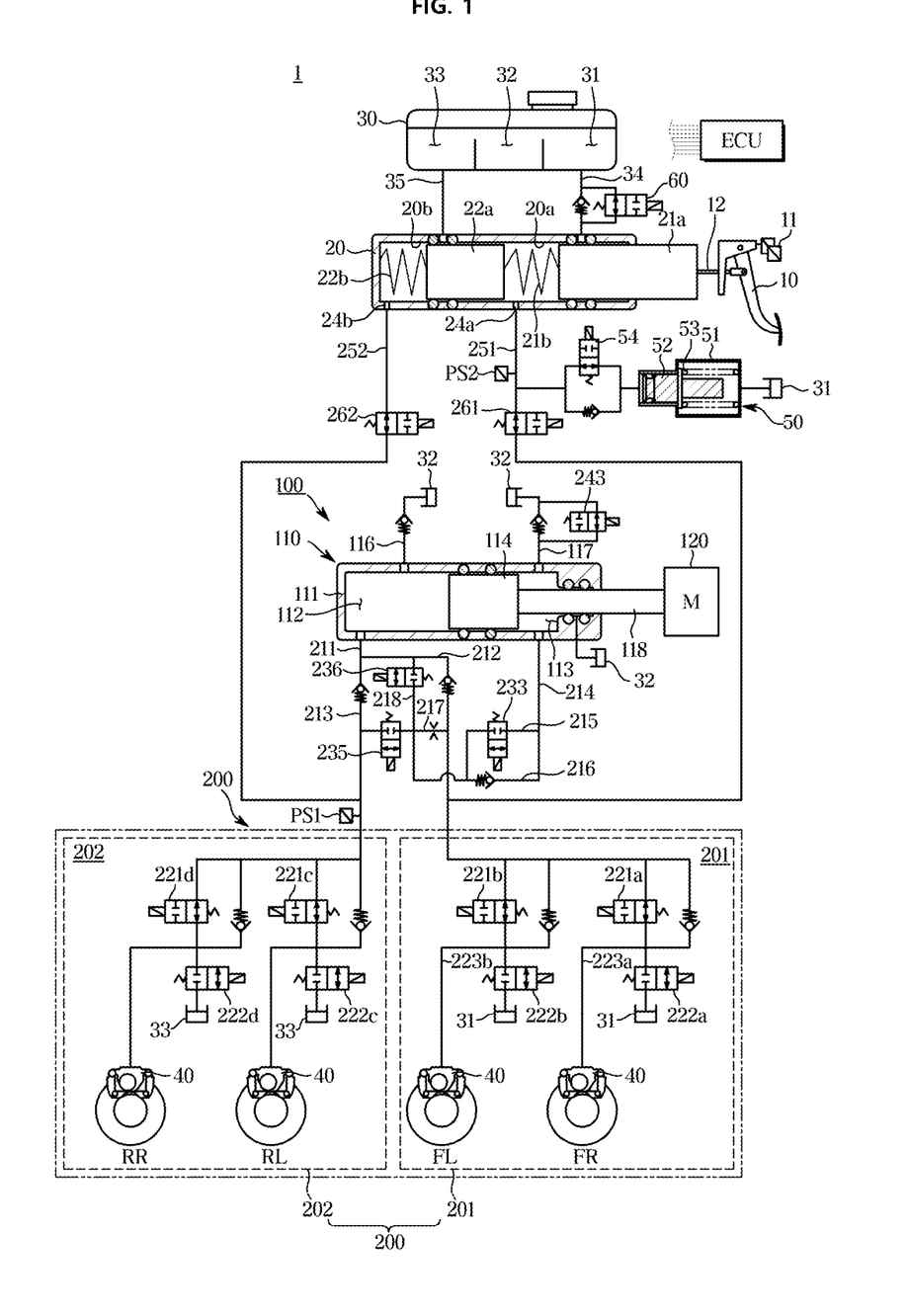
FIG. 1 is a hydraulic circuit diagram illustrating a non-braking state of an electronic brake system according to an embodiment of the present disclosure.

FIG. 1 is a hydraulic circuit diagram showing a non-braking state of an electronic brake system according to an embodiment of the present disclosure.

Referring to FIG. 1, an electronic brake system 1 includes a master cylinder 20 for generating a hydraulic pressure, a reservoir 30 coupled to an upper portion of the master cylinder 20 to store oil, an input rod 12 for pressing the master cylinder 20 in accordance with a pedal effort of a brake pedal 10, wheel cylinders 40 receiving the hydraulic pressure and performing a braking of each of wheels RR, RL, FR, and FL, a pedal displacement sensor 11 for sensing the displacement of the brake pedal 10, and a simulation apparatus 50 for providing a reaction force in accordance with the pedal effort of the brake pedal 10.

The master cylinder 20 include a first master chamber 20a and a second master chamber 20b. A first piston 21a connected to the input rod 12 may be provided in the first master chamber 20a, and a second piston 22a may be provided in the second master chamber 20b. A first spring 21b is provided between the first piston 21a and the second piston 22a, and a second spring 22b is provided between the second piston 22a and an end portion of the master cylinder 20.

The first master chamber 20a communicates with a first hydraulic port 24a to allow oil to flow in and out, and the second master chamber 20b communicates with a second hydraulic port 24b to allow oil to flow in and out. The first hydraulic port 24a may be connected to a first backup passage 251, and the second hydraulic port 24b may be connected to a second backup passage 252.

The first master chamber 20a may be connected to the reservoir 30 through a first reservoir passage 34. The second master chamber 20b may be connected to the reservoir 30 through a second reservoir flow passage 35.

An inspection valve 60 may be provided in the first reservoir passage 34. The inspection valve 60 controls a flow of oil between the reservoir 30 and the master cylinder 20.

The reservoir 30 may include three reservoir chambers 31, 32, and 33. The three reservoir chambers 31, 32, and 33 may be arranged side by side in a row. The adjacent reservoir chambers 31, 32, and 33 may be partitioned by partitions. Each partitions may be partially opened to allow the first to third reservoir chambers 31, 32, and 33 to communicate with each other.

The first reservoir chamber 31 may be connected to the first master chamber 20a of the master cylinder 20, the wheel cylinder 40, and the simulation apparatus 50. The first reservoir chamber 31 may be connected to two wheel cylinders of the four wheel cylinders 40, as an example, to the wheel cylinders 40 of a first hydraulic circuit 201 provided on the left front wheel FL and the right rear wheel FR.

The second reservoir chamber 32 may be connected to a hydraulic pressure supply apparatus 100. The second reservoir chamber 32 may be connected to first and second pressure chambers 112 and 113 of a hydraulic pressure providing unit 110 in the hydraulic pressure supply apparatus 100.

The third reservoir chamber 33 may be connected to the second master chamber 20b of the master cylinder 20 and the wheel cylinder 40. The third reservoir chamber 33 may be connected to the other two wheel cylinders of the four wheel cylinders 40, as an example, to the wheel cylinders 40 of a second hydraulic circuit 202 provided on the right rear wheel RR and the left rear wheel RL.

The simulation apparatus 50 may be connected to the first backup passage 251 to provide a reaction force in accordance with the pedal effort of the brake pedal 10.

The simulation apparatus 50 includes a simulation chamber 51 provided to store oil flowing out from the first hydraulic port 24a of the master cylinder 20, a reaction force piston 52 provided in the simulation chamber 51, a pedal simulator having a reaction force spring 53 for elastically supporting the reaction force piston, and a simulator valve 54 connected to a rear portion of the simulation chamber 51. The simulator valve 54 may connect a front portion of the master cylinder 20 and the simulation chamber 51, and a rear portion of the simulation chamber 51 may be connected to the reservoir 30. The simulator valve 54 may be opened when a driver applies the pedal effort to the brake pedal 10 to transmit the oil in the simulation chamber 51 to the reservoir 30.

In addition, the electronic brake system 1 according to an embodiment of the present disclosure may include the hydraulic pressure supply apparatus 100 which mechanically operates by receiving an electrical signal of a driver's braking will from the pedal displacement sensor 11 which detects the displacement of the brake pedal 10, a hydraulic control unit 200 including the first and second hydraulic circuits 201 and 202 for controlling a flow of hydraulic pressure transmitted to each of the wheel cylinders 40, a first cut valve 261 provided on the first backup passage 251 that connects the first hydraulic pressure port 24a and the first hydraulic circuit 201 to control the flow of hydraulic pressure, a second cut valve 262 provided on the second backup passage 252 that connects the second hydraulic pressure port 24b and the second hydraulic circuit 202 to control the flow of hydraulic pressure, and an electronic control unit (ECU) for performing overall control of a system controlling the hydraulic pressure supply apparatus 100 and valves 54, 60, 221a, 221b, 221c, 221d, 222a, 222b, 222c, 222d, 233, 235, 236 and 243 based on hydraulic pressure information and pedal displacement information.

The hydraulic pressure supply apparatus 100 may include the hydraulic pressure providing unit 110 for providing the hydraulic pressure transmitted to the wheel cylinders 40, and a motor 120 for providing a driving force for operating the hydraulic pressure providing unit 110.

The hydraulic pressure providing unit 110 may include a cylinder block 111 in which the pressure chambers 112 and 113 for receiving and storing oil are formed, a hydraulic piston 114 accommodated in the cylinder block 111, and a drive shaft 118 connected to a rear end of the hydraulic piston 114 to transmit power output from the motor 120 to the hydraulic piston 114.

The pressure chambers may include the first pressure chamber 112 positioned forward (forward direction, the leftward direction in the drawing) of the hydraulic piston 114 and the second pressure chamber 113 positioned rearward (rearward direction, the rightward direction in the drawing) of the hydraulic piston 114.

That is, the first pressure chamber 112 may be partitioned by the cylinder block 111 and the front end of hydraulic piston 114 so that the volume thereof changes according to the movement of the hydraulic piston 114. The second pressure chamber 113 is partitioned by the cylinder block 111 and the rear end of the hydraulic piston 114 so that the volume thereof changes according to the movement of the hydraulic piston 114.

The first pressure chamber 112 is connected to the first hydraulic passage 211. The second pressure chamber 113 is connected to a fourth hydraulic passage 214.

The first hydraulic passage 211 connects the first pressure chamber 112 to the first and second hydraulic circuits 201 and 202. The first hydraulic passage 211 is branched to a second hydraulic passage 212 communicating with the first hydraulic circuit 201 and a third hydraulic passage 213 communicating with the second hydraulic circuit 202.

The fourth hydraulic passage 214 connects the second pressure chamber 113 to the first and second hydraulic circuits 201 and 202. The fourth hydraulic passage 214 is branched to a fifth hydraulic passage 215 communicating with the first hydraulic circuit 201 and a sixth hydraulic passage 216 communicating with the second hydraulic circuit 202.

The first and second pressure chambers 112 and 113 are connected to the reservoir 30 by dump passages 116 and 117, respectively. The first and second pressure chambers 112 and 113 may receive and store oil from the reservoir 30, or transmit oil of the first or second pressure chambers 112 and 113 to the reservoir 30.

The first hydraulic passage 211 is branched to the second hydraulic passage 212 and the third hydraulic passage 213 on the way. The second hydraulic passage 212 may communicate with the first hydraulic circuit 201. The third hydraulic passage 213 may communicate with the second hydraulic circuit 202. Therefore, the hydraulic pressure may be transmitted to the first hydraulic circuit 201 and the second hydraulic circuit 202 by the forward movement of the hydraulic piston 114.

The fourth hydraulic passage 214 is branched to the fifth hydraulic passage 215 and the sixth hydraulic passage 216 which are respectively connected to a seventh hydraulic passage 217 connecting the second hydraulic passage 212 and the third hydraulic passage 213.

Therefore, the hydraulic pressure may be transmitted to both the first hydraulic circuit 201 and the second hydraulic circuit 202 by backward movement of the hydraulic piston 114.

A first control valve 233 may be provided on the fifth hydraulic passage 215.

A second control valve 235 may be provided on the seventh hydraulic passage 217.

A third control valve 236 may be provided on an eighth hydraulic passage 218 connecting the second hydraulic passage 212 and the seventh hydraulic passage 217.

A dump valve 243 may be provided on a bypass passage of the dump passages 117 among the dump passages 116 and 117.

Hereinafter, operation of the hydraulic pressure supply apparatus 100 1 including the above-described components will be described.

The hydraulic pressure is generated in the first pressure chamber 112 by the forward movement of the hydraulic piston 114. The generated hydraulic pressure is transmitted to the first hydraulic circuit 201 through the first and second hydraulic passages 211 and 212 to operate the wheel cylinders 40 installed on the right front wheel FR and the left front wheel FL. In addition, the generated hydraulic pressure is transmitted to the second hydraulic circuit 202 through the first and third hydraulic passages 211 and 213 to operate the wheel cylinders 40 installed on the right rear wheel RR and the left rear wheel RL. As the hydraulic piston 114 advances in an initial state, that is, as a stroke of the hydraulic piston 114 increases, the amount of oil transmitted from the first pressure chamber 112 to the wheel cylinders 40 increases, thereby increasing braking pressure.

Likewise, the hydraulic pressure is generated in the second pressure chamber 113 by backward movement of the hydraulic piston 114. The generated hydraulic pressure is transmitted to the first hydraulic circuit 201 through the fourth hydraulic passage 214, the fifth hydraulic passage 215, the sixth hydraulic passage 216, and the seventh hydraulic passage 217 to operate the wheel cylinders 40 installed on the right front wheel (FR) and the wheel cylinder and the left rear wheel FL, and is transmitted to the second hydraulic circuit 202 through the fourth hydraulic passage 214, the fifth hydraulic passage 215, the sixth hydraulic passage 216, and the seventh hydraulic passage 217 to operate the wheel cylinders 40 installed on the right rear wheel RR and the left front wheel FL.

Meanwhile, the hydraulic control unit 200 may include the first hydraulic circuit 201 and the second hydraulic circuit 202.

The hydraulic circuits 201 and 202 may include a plurality of inlet valves 221 (221a. 221b, 221c, and 221d) to control the flow of the hydraulic pressure.

The hydraulic circuits 201 and 202 may include a plurality of outlet valves 222 (222a, 222b, 222c, and 222d).

The hydraulic control unit 200 may be connected to the backup passages 251 and 252. The first hydraulic circuit 201 may be connected to the first backup passage 251 to receive the hydraulic pressure from the master cylinder 20. The second hydraulic circuit 202 may be connected to the second backup passage 252 to receive the hydraulic pressure from the master cylinder 20.

When the first and second cut valves 261 and 262 are closed, the hydraulic pressure provided from the hydraulic pressure supply apparatus 100 may be supplied to the wheel cylinders 40 through the first and second hydraulic circuits 201 and 202. When the first and second cut valves 261 and 262 are opened, the hydraulic pressure provided from the master cylinder 20 may be supplied to the wheel cylinders 40 through the first and second backup passages 251 and 252.

Meanwhile, reference numeral PS1 is a circuit passage pressure sensor for sensing the hydraulic pressure of the hydraulic circuits 201, 202. Reference numeral PS2 is a backup passage pressure sensor for measuring the hydraulic pressure of the master cylinder 20.

Hereinafter, the electronic brake system 1 including the above-described components is actuated by an anti-lock brake system (ABS) mode will be described. In this embodiment, for example, the right rear wheel RR is operated by the ABS, but the present disclosure is not limited thereto and may also apply the ABS to other wheels.

Figure 2:
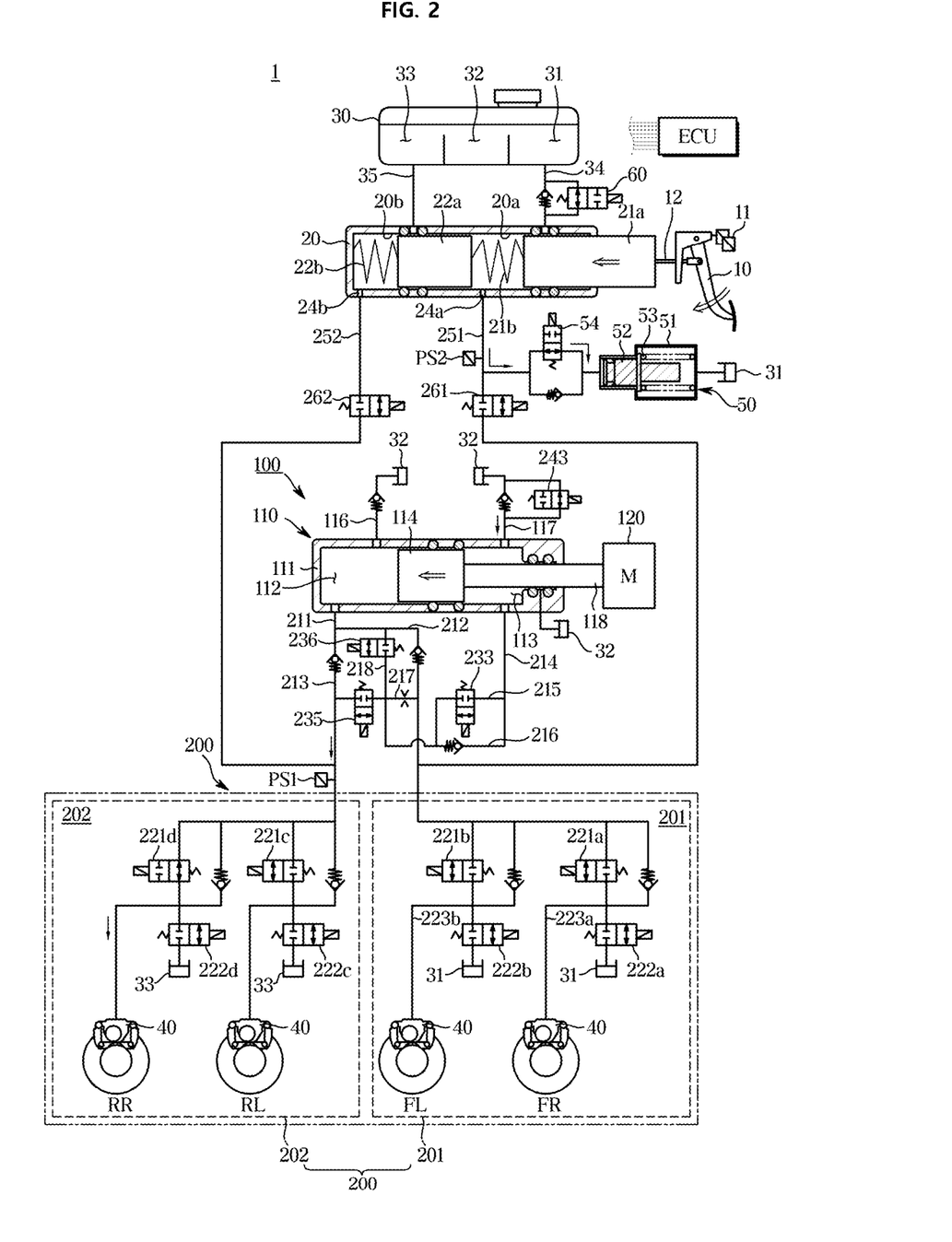
FIG. 2 is a hydraulic circuit diagram illustrating a generation of hydraulic pressure by forward movement of the hydraulic piston in the ABS operation in the electronic brake system according to the embodiment of the present disclosure.

FIG. 2 is a hydraulic circuit diagram showing a generation of hydraulic pressure by the forward movement of the hydraulic piston during the ABS operation in the electronic brake system according to the embodiment of the present disclosure.

Referring to FIG. 2, when the ABS is operated, the motor 120 is rotated in a one direction in accordance with the pedal effort of the brake pedal 10. The hydraulic piston 114 of the hydraulic pressure providing unit 110 moves in the forward direction by the driving force of the motor 120. The hydraulic pressure is generated in the first pressure chamber 112 by the forward movement of the hydraulic piston 114.

At this time, the first and second cut valves 261 and 262 are switched to the closed state so that the hydraulic pressure discharged from the master cylinder 20 is not transmitted to the wheel cylinders 40. The fourth inlet valve 221d maintains the open state, and the first to third inlet valves 221a, 221b, and 221c are switched to the closed state. The first to fourth outlet valves 222a, 222b, 222c, and 222d are maintained in the closed state. The dump valve 243 maintains the open state so as to fill oil in the second pressure chamber 113 from the reservoir 30.

In addition, the first control valve 233, the second control valve 235, and the third control valve 236 may be maintained the closed state. Accordingly, the fourth hydraulic passage 214, the fifth hydraulic passage 215, the seventh hydraulic passage 217, and the eighth hydraulic passage 218 may be blocked. The first control valve 233 and the third control valve 236 may be switched to the open state so that the hydraulic pressure generated in the first pressure chamber 112 is transmitted to the second pressure chamber 113 through the first hydraulic passage 211 and the fifth hydraulic passage 215 to be used to push the hydraulic piston 114.

At this time, the hydraulic pressure generated in the first pressure chamber 112 by the forward movement of the hydraulic piston 114 is supplied to the wheel cylinder 40 installed on the right rear wheel RR through the first hydraulic passage 211 and the third hydraulic passage 213. Accordingly, the braking of the right rear wheel RR is performed by the hydraulic pressure provided to the wheel cylinder 40 installed on the right rear wheel RR.

Figure 3:
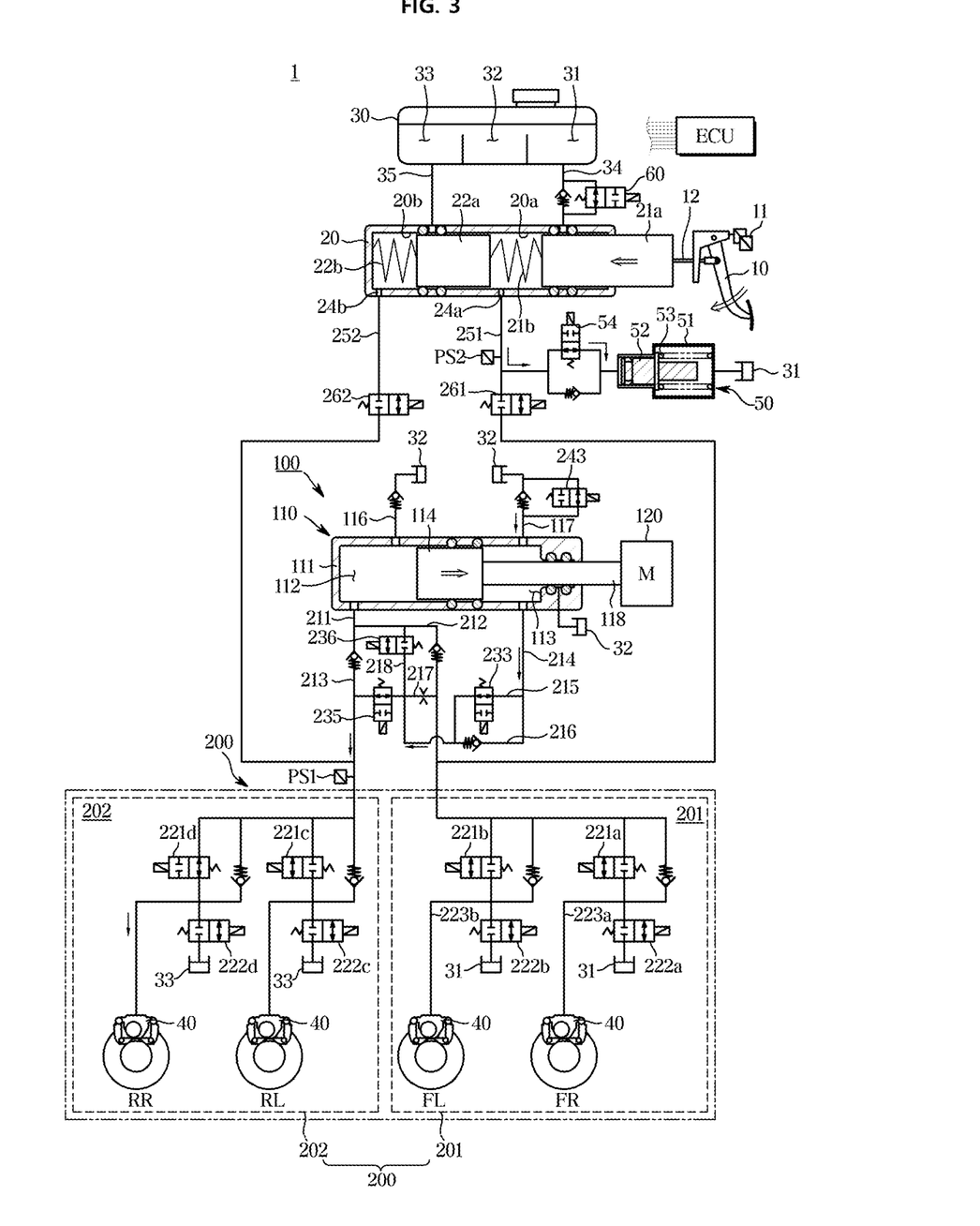
FIG. 3 is a hydraulic circuit diagram illustrating a generation of hydraulic pressure by backward movement of the hydraulic piston in the ABS operation in the electronic brake system according to the embodiment of the present disclosure.

FIG. 3 is a hydraulic circuit diagram showing the generation of hydraulic pressure by the backward movement of the hydraulic piston during the ABS operation in the electronic brake system according to the embodiment of the present disclosure.

Referring to FIG. 3, when the hydraulic piston 114 is moved backward during the ABS operation, the motor 120 is rotated in an opposite direction. The hydraulic piston 114 of the hydraulic pressure providing unit 110 moves in the backward direction by the driving force of the motor 120. The hydraulic pressure is generated in the second pressure chamber 113 by the backward movement of the hydraulic piston 114.

The generated hydraulic pressure in the second pressure chamber 113 by the backward movement of the hydraulic piston 114 is supplied to the wheel cylinder 40 installed on the right rear wheel RR through the fourth hydraulic passage 214, the fifth hydraulic passage 215, the sixth hydraulic passage 216, the seventh hydraulic passage 217, and the third hydraulic passage 213. Accordingly, the braking of the right rear wheel RR is performed by the hydraulic pressure provided to the wheel cylinder 40 installed on the right rear wheel RR.

At this time, the first control valve 233 and the second control valve 235 are switched to the open state so that the hydraulic pressure in the second pressure chamber 113 is supplied to the wheel cylinder 40 installed on the right rear wheel RR.

As such, a valve operation noise is generated because the hydraulic piston 114 of the hydraulic pressure supply apparatus 100 is accompanied with valve operation when changing the direction from the forward direction to the backward direction or from the backward direction to the forward direction.

ABS fade-out section, which is a ultra-low speed section immediately before the vehicle is stopped by the ABS operation, has relatively low ambient noise, so that the valve operation noise generated when the hydraulic piston 114 is changed in direction may be greatly heard by the driver. Therefore, the driver may feel uncomfortable and the braking satisfaction may be degraded.

Accordingly, in the embodiment of the present disclosure, the operation of the hydraulic piston 114 is minimized in a low speed section during the ABS operation, thereby reducing the valve operation noise due to the direction change of the hydraulic piston 114 in the low speed section.

Figure 4:
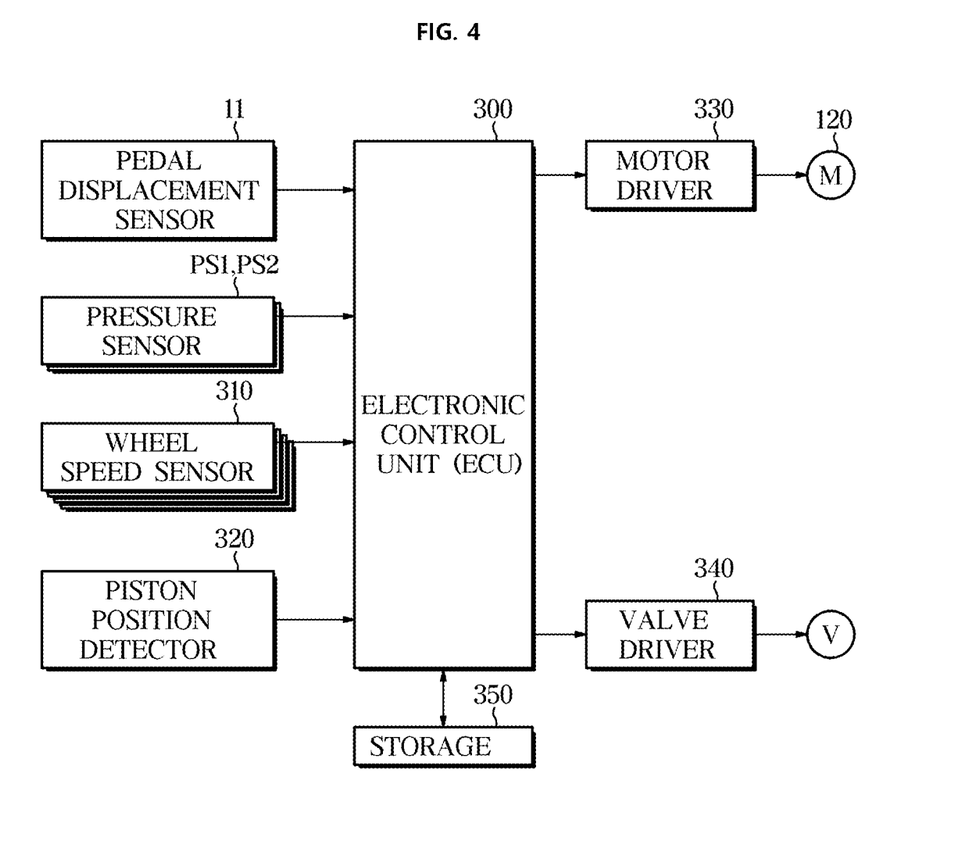
FIG. 4 is a schematic control block diagram of the electronic brake system according to the embodiment of the present disclosure.

FIG. 4 is a schematic control block diagram of the electronic brake system according to the embodiment of the present disclosure.

Referring to FIG. 4, the electronic brake system may include an electronic control unit (ECU) 300 performing overall control.

The pedal displacement sensor 11, the pressure sensors PS1 and PS2, and a piston position detector 320 are electrically connected to an input side of the ECU 300.

A motor driver 330 and a valve driver 340 are electrically connected to an output side of the ECU 300.

A storage 350 is electrically connected to the input/output side of the ECU 300.

The pedal displacement sensor 11 is provided in the brake pedal 10 to sense operation and displacement of the brake pedal 10. The pedal displacement information sensed by a pedal displacement sensor 11 is transmitted to the ECU 300.

A wheel speed sensor 310 is provided on each wheel to sense speed of each wheels. The speed of each wheels sensed by the wheel speed sensor 310 is provided to the ECU 300. The ECU 300 determines a vehicle speed based on each wheel speed information. The ECU 300 may receive each wheel speed information from another system instead of the wheel speed sensor 310.

The piston position detector 320 senses a position of the hydraulic piston 114. The piston position detector 320 may include a motor position sensor for detecting a rotor position of the motor 120. In addition, the piston position detector 320 may directly sense the position of the hydraulic piston 114. The piston position information sensed by the piston position detector 320 is transmitted to the ECU 300. The ECU 300 may measure an actual stroke of the hydraulic piston 114 in accordance with the change of position (or displacement) of the piston.

The motor driver 330 drives the motor (M) 120 in a forward or reverse rotation in response to a control signal of the ECU 300.

The valve driver 340 operates valves (V) 54, 60, 221*a*, 221*b*, 221*c*, 221*d*, 222*a*, 222*b*, 222*c*, 222*d*, 233, 235, 236, and 243 of the electronic brake system according to the control signal of the ECU 300.

The storage 350 stores various types of information related to operation of the electronic brake system. The storage 350 stores a direction change forward threshold, a direction change backward threshold, and a forward direction target position at an entry time point of an ABS fade-out section, which will be described later.

The ECU 300 may include an algorithm for performing overall control of the electronic brake system, or a memory for storing data for a program reproducing the algorithm, and a microprocessor for implementing an operation necessary for controlling the electronic brake system using the data stored in the memory. The memory and the processor may be implemented as separate chips or a single chip.

The ECU 300 generates hydraulic pressure by moving the hydraulic piston 114 using the rotational force of the motor 120 in the ABS operation, and performs the braking of each wheels by using the generated hydraulic pressure.

The ECU 300 calculates a displacement amount of the hydraulic piston 114 with respect to a vehicle speed change amount during the ABS operation. The ECU 300 calculates the actual stroke of the hydraulic piston 114 by using the calculated of the displacement amount of the hydraulic piston 114 with respect to the vehicle speed change amount, which is calculated. The ECU 300 estimates the position of the hydraulic piston 114 at an entry time point of a preset low speed section, for example, at an entry time point of an ABS fade-out section, based on the calculated actual stroke. The ECU 300 estimates a moving direction remaining stroke (a forward direction remaining stroke or a backward direction remaining stroke) on the basis of the position of the hydraulic piston 114 and the moving direction of the hydraulic piston 114, which are estimated. The ECU 300 determines whether or not to change in advance the moving direction of the hydraulic piston 114 before entering the preset low speed section based on the estimated moving direction remaining stroke. That is, the ECU 300 determines whether to perform a positioning for changing the moving direction of the hydraulic piston 114 in advance or to perform a non-positioning for maintaining the moving direction thereof before entering the preset low speed section based on the estimated moving direction remaining stroke.

The ECU 300 compares the estimated moving direction remaining stroke at the entry time point of the preset low speed section with a predetermined moving direction minimum remaining stroke, and when the estimated moving direction remaining stroke is greater than the moving direction minimum remaining stroke, the ECU 300 maintains the moving direction of the hydraulic piston 114 without changing the moving direction in advance before entering of the preset low speed section.

The ECU 300 compares the estimated moving direction remaining stroke at the entry time point of the preset low speed section with the predetermined moving direction minimum remaining stroke, and when the estimated moving direction remaining stroke is smaller than the moving direction minimum remaining stroke, the ECU 300 changes the moving direction of the hydraulic piston 114 in advance before entering of the preset low speed section.

The ECU 300 estimates a virtual stroke of the hydraulic piston 114 by performing an inverse operation from a target position at the entry time point of the preset low speed section based on the displacement amount of the hydraulic piston 114 with respect to the vehicle speed change amount during ABS operation and the target position at the entry time point of the preset low speed section. The ECU 300 may set the virtual stroke for positioning from the target position at the entry time point of the preset low speed section by using consumed volumes of the pressure chambers 112 and 113 per vehicle speed.

The ECU 300 changes the moving direction of the hydraulic piston 114 in advance such that the actual stroke follows the virtual stroke when the actual stroke of the hydraulic piston 114 behaves differently from the virtual stroke for positioning. That is, when the actual stroke behaves differently from the virtual stroke, the moving direction remaining stroke is not sufficiently secured in the preset low speed section, so the direction change of the hydraulic piston is expected in the preset low speed section, the ECU 300 changes the hydraulic piston 114 in an opposite direction before entering the preset low speed section. Accordingly, the moving direction remaining stroke in the preset low speed section is sufficiently secured, thereby reducing the frequency of directional changes of the hydraulic piston 114 in the preset low speed section.

Figure 5:
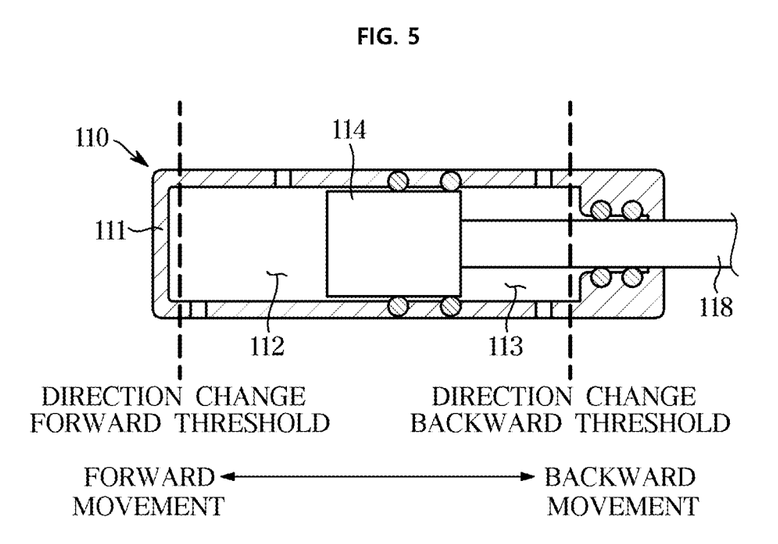
FIG. 5 is a view for describing a direction change forward threshold and a direction change backward threshold when the hydraulic piston moves forward or backward in the electronic brake system according to the embodiment of the present disclosure.

FIG. 5 is a view for describing a direction change forward threshold value and a direction change backward threshold value when the hydraulic piston moves forward or backward in the electronic brake system according to the embodiment of the present disclosure.

Referring to FIG. 5, the direction change forward threshold is a threshold value at which the end of the hydraulic piston 114 may approach a one side wall of the first pressure chamber 112 located in the forward direction when the hydraulic piston 114 moves forward. The direction change forward threshold may be the one side wall of the first pressure chamber 112 or a position spaced a predetermined distance from the one side wall of the first pressure chamber 112.

The direction change backward threshold is a threshold value at which the end of the hydraulic piston 114 may approach a one wall of the second pressure chamber 113 located in the reverse direction when the hydraulic piston 114 moves backward. The direction change backward threshold value may be the one side wall of the second pressure chamber 113 or a position spaced a predetermined distance from the one side wall of the second pressure chamber 113.

The hydraulic piston 114 moves forward to the direction change forward threshold when moving forward. The hydraulic piston 114 moves in the reverse direction after reaching the direction change forward threshold.

As the hydraulic piston 114 moves forward, the volume of the first pressure chamber 112 is changed to increase the stroke of the hydraulic piston 114. As the stroke of the hydraulic piston 114 increases, the amount of oil transmitted from the first pressure chamber 112 to the wheel cylinders 40 increases, thereby increasing braking pressure.

The hydraulic piston 114 moves backward to the direction change backward threshold when moving in the reverse direction. The hydraulic piston 114 moves forward after reaching the direction change backward threshold.

As the hydraulic piston 114 moves backward, the volume of the second pressure chamber 113 is changed to increase the stroke of the hydraulic piston 114. As the stroke of the hydraulic piston 114 increases, the amount of oil transmitted from the second pressure chamber 113 to the wheel cylinders 40 increases, thereby increasing braking pressure.

Figure 6:
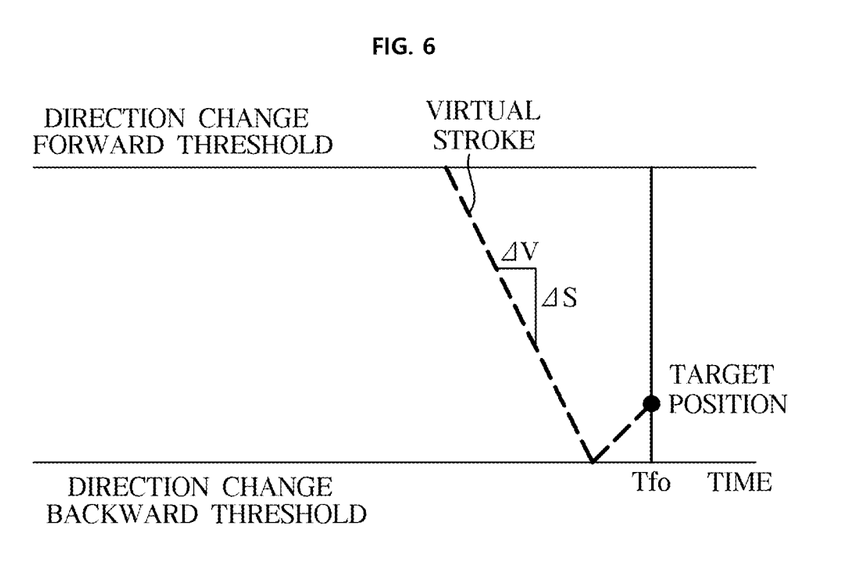
FIG. 6 is a view for describing a virtual stroke inverted from a target position at an entry time point of an ABS fade-out section by using a piston displacement amount with respect to a vehicle speed change amount when the ABS operation is performed in the electronic brake system according to the embodiment of the present disclosure.

FIG. 6 is a view for describing the virtual stroke inverted from the target position at the entry time point of the ABS fade-out section by using the piston displacement amount with respect to the vehicle speed change amount during the ABS operation in the electronic brake system according to the embodiment of the present disclosure.

Referring to FIG. 6, Tfo is a time point when the vehicle enters the ABS fade-out section, which is an ultra-low speed section immediately before the vehicle is stopped by the ABS operation.

The forward direction target position of the hydraulic piston 114 at the entry time point of the ABS fade-out section is set in advance. The forward direction target position is a piston position that may secure sufficiently the forward direction remaining stroke in the ABS fade-out section.

The virtual stroke of the hydraulic piston 114 for positioning is estimated by performing an inverse operation from the forward direction target position at the entry time point of the ABS fade-out section based on the displacement amount $\Delta S$ ($\Delta$Vol/volume factor) of the hydraulic piston 114 with respect to the vehicle speed change amount $\Delta V$ during the ABS operation. At this time, $\Delta$Vol is a chamber volume change amount, and volume factor is a constant set in advance.

For example, when the speed of any one of the front wheels of the vehicle is 5 kph, it may be determined as the entry time point of the ABS fade-out section.

Assuming that the displacement amount $\Delta S$ of the hydraulic piston 114 in the forward direction is 10 mm while the vehicle speed is reduced from 80 kph to 70 kph, 10 kph by the ABS operation with the vehicle speed change amount $\Delta V$, a displacement of 1 mm occurs per 1 kph. Therefore, with respect to a vehicle speed change of 65 kph from 70 kph to 5 kph, which is an entry speed of 5 kph of the ABS fade-out section, the hydraulic piston 114 has a displacement amount of 65 mm.

The hydraulic piston 114 moves while changing directions in the forward direction and the reverse direction between the direction change forward threshold and the direction change reverse threshold.

The virtual stroke of the hydraulic piston 114 for positioning is estimated by performing an inverse operation from the forward direction target position at the entry time point of the ABS fade-out section by using a value (ΔS/ΔV) of the displacement amount (ΔS) of the hydraulic piston 114 with respect to the vehicle speed change amount (ΔV), that is, a gradient of 1 mm/kph and the displacement amount of 65 mm.

Figure 7:
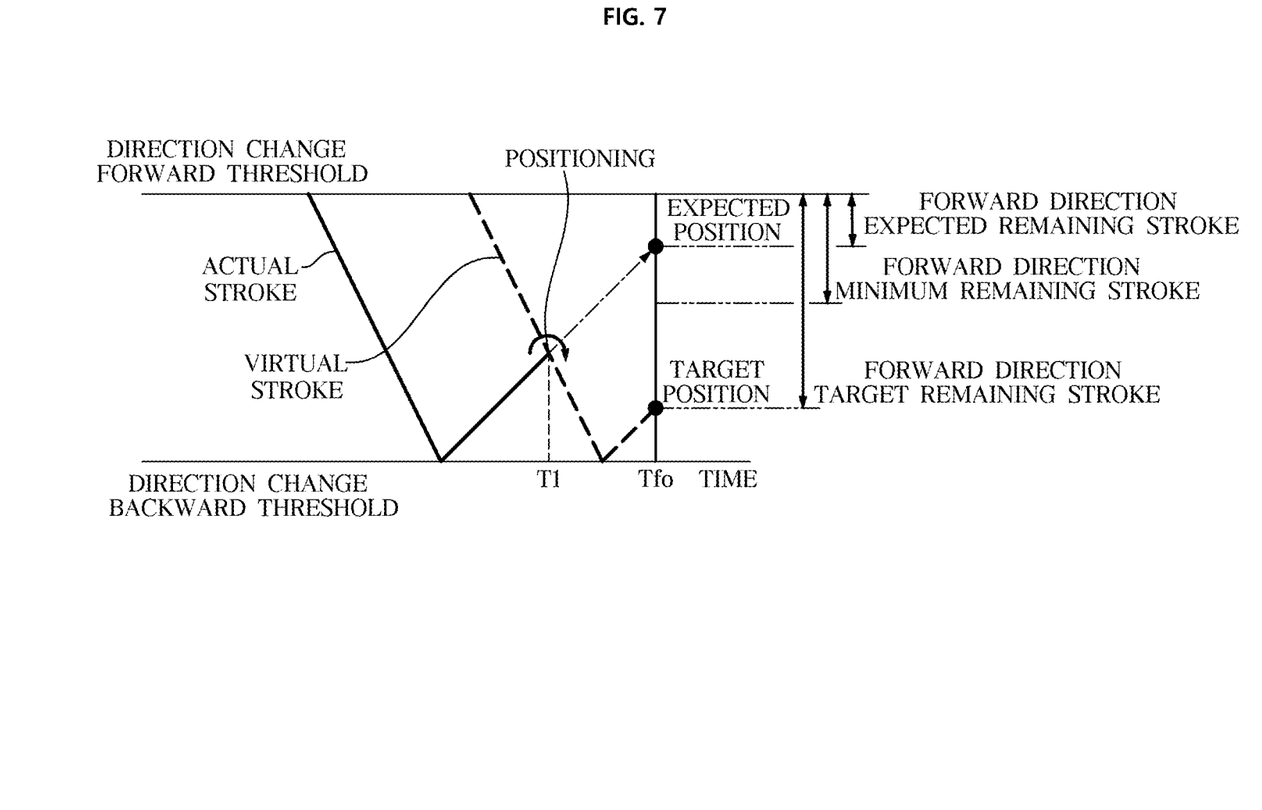
FIG. 7 is a view for describing a case in which a forward direction expected remaining stroke corresponding to a piston expected position at the entry time point of the ABS fade-out section is smaller than a forward direction minimum remaining stroke in the electronic brake system according to the embodiment of the present disclosure.

FIG. 7 is a view for describing a case in which a forward direction expected remaining stroke corresponding to a piston expected position at the entry time point of the ABS fade-out section is smaller than a forward direction minimum remaining stroke in the electronic brake system according to the embodiment of the present disclosure.

Referring to FIG. 7, the expected position of the hydraulic piston 114 at the entry time point of the ABS fade-out section Tfo is estimated based on the actual stroke of the hydraulic piston 114.

The forward direction remaining stroke is estimated in accordance with the estimated expected position of the hydraulic piston 114 and the forward direction in which the hydraulic piston 114 is currently moving.

Since the forward direction remaining stroke is estimated to be smaller than the forward direction minimum remaining stroke, it is determined that the forward direction remaining stroke cannot be sufficiently secured in the ABS fade-out section. Therefore, there is a possibility that the direction change of the hydraulic piston 114 occurs in the ABS fade-out section, which may cause the valve operation noise in the ABS fade-out section in which ambient noise is small.

Accordingly, by changing the moving direction of the hydraulic piston 114 in advance before entering of the ABS fade-out section, the hydraulic piston 114 may enter the ABS fade-out section while securing sufficiently the forward direction remaining stroke.

At a time point T1 at which the actual stroke and the virtual stroke of the hydraulic piston 114 intersect, the direction of the hydraulic piston 114 is changed in advance from the forward direction to the backward direction such that the actual stroke follows the virtual stroke. Accordingly, the hydraulic piston 114 reaches the target position rather than the expected position at the entry time point Tfo of the ABS fade-out section. Since the target position has a forward direction target remaining stroke that is greater than the forward direction minimum remaining stroke, the forward direction remaining stroke may be sufficiently secured in the ABS fade-out section, so that the direction change of the hydraulic piston 114 may be minimized, thereby reducing the valve operation noise.

As such, when the hydraulic piston 114 enters the ABS fade-out section while the forward direction remaining stroke is not secured sufficiently and the direction change of the hydraulic piston 114 is expected in the ABS fade-out section, the moving direction of the hydraulic piston 114 is changed in the reverse direction in advance even when the hydraulic piston 114 has not reached the direction change forward threshold before entering the ABS fade-out section. Accordingly, entering the ABS fade-out section while the forward direction remaining stroke is sufficiently secured in may be possible, so that the direction change of the hydraulic piston 114 in the ABS fade-out section may be minimized, thereby reducing the valve operation noise.

Figure 8:
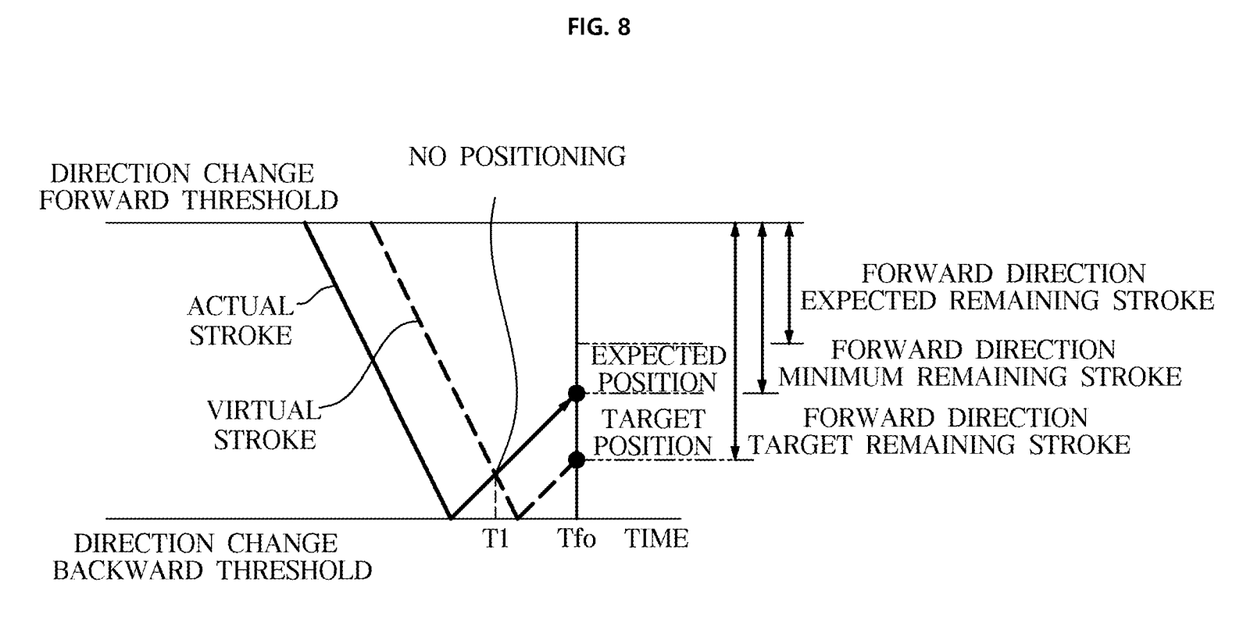
FIG. 8 is a view for describing a case in which the forward direction expected remaining stroke in accordance with the piston expected position at the entry time point of the ABS fade-out section is greater than the forward direction minimum remaining stroke in the electronic brake system according to the embodiment of the present disclosure.

FIG. 8 is a view for describing a case in which the forward direction expected remaining stroke corresponding to the piston expected position at the entry time point of the ABS fade-out section is greater than the forward direction minimum remaining stroke in the electronic brake system according to the embodiment of the present disclosure.

Referring to FIG. 8, the expected position of the hydraulic piston 114 at the entry time point Tfo of the ABS fade-out section is estimated based on the actual stroke of the hydraulic piston 114.

The forward direction expected remaining stroke is estimated in accordance with the estimated expected position of the hydraulic piston 114 and the forward direction in which the hydraulic piston 114 is currently moving.

Since the forward direction remaining stroke is estimated to be smaller than the forward direction minimum remaining stroke, it is determined that the forward direction remaining stroke may be sufficiently secured in the ABS fade-out section.

Accordingly, at the time point T1 at which the actual stroke and the virtual stroke intersect, the hydraulic piston 114 is moved according to the actual stroke without allowing the actual stroke to follow the virtual stroke (no positioning). That is, at the time point T1, the hydraulic piston 114 moves continuously in the forward direction without changing the moving direction in advance from the forward direction to the backward direction.

As such, in the embodiment of the present disclosure, in consideration of the ABS cycle, by adequately securing the moving direction remaining stroke at the time point of the ABS fade-out section through the stroke positioning of the hydraulic piston 114 before entering the ABS fade-out section, which is a ultra-low speed section, so that the frequency of directional changes in the ABS fade-out section may be minimized, thereby reducing noise, vibration, and harshness (NVH).

As is apparent from the above, the electronic brake system according to the embodiment of the present disclosure can reduce the operation noise of the hydraulic pressure supply apparatus due to the direction change of the piston by minimizing the direction change of the piston in the low speed section immediately before the vehicle stops during the ABS operation.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic brake system, comprising:
   a hydraulic pressure supply apparatus configured to generate a hydraulic pressure by moving a piston forward or backward with a rotational force of a motor, and supply the generated hydraulic pressure to wheel cylinders provided at wheels, respectively;
   a wheel speed sensor configured to detect speed of each of the wheels;
   a piston position detector configured to detect a position of the piston; and
   an electronic control unit (ECU) configured to:
   calculate a piston displacement amount with respect to a vehicle speed change amount during an anti-lock brake system (ABS) operation;
   calculate an actual stroke of the piston by using the calculated piston displacement amount with respect to the vehicle speed change amount;
   estimate a position of the piston at an entry time point of a preset low speed section based on the calculated actual stroke;
   estimate a moving direction remaining stroke based on the estimated position of the piston and a moving direction of the piston; and determine whether to change the moving direction of the piston in advance before entering the preset low speed section based on the estimated moving direction remaining stroke.

2. The electronic brake system of claim 1,
wherein the ECU compares the estimated moving direction remaining stroke at the entry time point of the preset low speed section with a preset moving direction minimum remaining stroke; and
when the estimated moving direction remaining stroke is greater than the preset moving direction minimum remaining stroke, maintains the moving direction of the piston without changing the moving direction of the piston in advance before entering the preset low speed section.

3. The electronic brake system of claim 1,
wherein the ECU compares the estimated moving direction remaining stroke at the entry time point of the preset low speed section with a preset moving direction minimum remaining stroke; and
when the estimated moving direction remaining stroke is smaller than the preset moving direction minimum remaining stroke, changes the moving direction of the piston in advance before entering the preset low speed section.

4. The electronic brake system of claim 3,
wherein the ECU estimates a virtual stroke of the piston by performing an inverse operation from a preset target position of the piston at the entry time point of the low speed section based on the calculated piston displacement amount with respect to the vehicle speed change amount and the preset target position of the piston; and
compares the calculated actual stroke with the estimated virtual stroke, and changes the moving direction of the piston in advance at a time point at which the calculated actual stroke and the estimated virtual stroke intersect such that the calculated actual stroke follows the estimated virtual stroke before entering the preset low speed section.

5. The electronic brake system of claim 1,
wherein the preset low speed section is an anti-lock brake system (ABS) fade-out section.

6. An electronic brake system, comprising:
a hydraulic pressure supply apparatus configured to generate a hydraulic pressure by moving a piston forward or backward with a rotational force of a motor, and supply the generated hydraulic pressure to wheel cylinders provided at wheels, respectively;
a wheel speed sensor configured to detect speed of each of the wheels;
a piston position detector configured to detect a position of the piston; and
an electronic control unit (ECU) configured to:
calculate a piston displacement amount with respect to a vehicle speed change amount during an anti-lock brake system (ABS) operation;
calculate an actual stroke of the piston by using the calculated piston displacement amount with respect to the vehicle speed change amount;
estimate a virtual stroke of the piston by performing an inverse operation from a preset target position of the piston at the entry time point of a low speed section based on the calculated piston displacement amount with respect to the vehicle speed change amount and the preset target position of the piston;
compare the calculated actual stroke with the estimated virtual stroke, and when the calculated actual stroke behaves differently from the estimated virtual stroke, changes the moving direction of the piston in advance at a time point at which the calculated actual stroke and the estimated virtual stroke intersect such that the calculated actual stroke follows the estimated virtual stroke before entering a preset low speed section.

7. An electronic brake system, comprising:
a hydraulic pressure supply apparatus configured to generate a hydraulic pressure by moving a piston forward or backward with a rotational force of a motor, and supply the generated hydraulic pressure to wheel cylinders provided at wheels, respectively;
a wheel speed sensor configured to detect speed of each of the wheels;
a piston position detector configured to detect a position of the piston; and
an electronic control unit (ECU) configured to:
calculate a piston displacement amount with respect to a vehicle speed change amount during an anti-lock brake system (ABS) operation;
calculate an actual stroke of the piston by using the calculated piston displacement amount with respect to the vehicle speed change amount;
estimate a virtual stroke of the piston by performing an inverse operation from a preset target position of the piston at the entry time point of a low speed section based on the calculated piston displacement amount with respect to the vehicle speed change amount and the preset target position of the piston;
determine whether a preset forward direction remaining stroke is secured at an entry time point of an ABS fade-out section based on the calculated actual stroke, and when the preset forward direction remaining stroke is not secured, change the moving direction of the piston in advance at a time point at which the calculated actual stroke and the estimated virtual stroke intersect such that the calculated actual stroke follows the estimated virtual stroke, and when the preset forward direction remaining stroke is secured, maintain the moving direction of the piston without changing the moving direction of the piston in advance.

* * * * *